United States Patent
Ghilardelli et al.

[11] Patent Number: 6,075,402
[45] Date of Patent: Jun. 13, 2000

[54] POSITIVE CHARGE PUMP

[75] Inventors: Andrea Ghilardelli, Milan; Jacopo Mulatti, Udine; Stefano Ghezzi, Bergamo, all of Italy

[73] Assignee: SGS-Thomson Microelectronics S.r.l., Agrate Brianza, Italy

[21] Appl. No.: 08/946,727

[22] Filed: Oct. 8, 1997

[30] Foreign Application Priority Data

Oct. 11, 1996 [EP] European Pat. Off. ............... 96830521

[51] Int. Cl.$^7$ ........................................ G05F 1/10
[52] U.S. Cl. .............................. 327/536; 327/537; 363/60
[58] Field of Search .................................. 327/534, 536, 327/537, 589; 363/59, 60

[56] References Cited

U.S. PATENT DOCUMENTS

| | | | |
|---|---|---|---|
| 4,922,402 | 5/1990 | Olivo et al. | 363/60 |
| 5,081,371 | 1/1992 | Wong | 363/60 |
| 5,489,870 | 2/1996 | Arakawa | 327/537 |
| 5,589,793 | 12/1996 | Kassapian | 327/536 |

FOREIGN PATENT DOCUMENTS

| | | | |
|---|---|---|---|
| 0 303 193 | 2/1989 | European Pat. Off. | H02M 3/07 |
| 0 455 083 | 9/1991 | European Pat. Off. | H02M 3/07 |

*Primary Examiner*—Jung Ho Kim
*Attorney, Agent, or Firm*—Wolf, Greenfield & Sacks, P.C.; James H. Morris; Theodore E. Galanthay

[57] ABSTRACT

A charge pump comprises a plurality of stages connected in series, an input terminal of the charge pump being connected to a voltage supply and an output terminal of the charge pump providing an output voltage higher than the voltage supply. Each stage comprises unidirectional current flow MOS transistor means connected between a stage input terminal and a stage output terminal allowing current to flow only from said stage input terminal to said stage output terminal, and a first capacitor with one plate connected to said stage output terminal and another plate driven by a respective first digital signal periodically switching between ground and said voltage supply. The unidirectional current flow MOS transistor means of the stages have independent bulk electrodes, and a bias voltage generator circuit is provided for biasing the bulk electrodes of said unidirectional current flow MOS transistor means at respective bulk potentials which become progressively higher going from the stages proximate to said input terminal to the stages proximate to said output terminal of the charge pump.

22 Claims, 2 Drawing Sheets

POSITIVE CHARGE PUMP

BACKGROUND OF THE INVENTION

1. Field of the Invention

The present invention relates to an improved positive charge pump, particularly for the integration in CMOS integrated circuits such as non-volatile memory devices.

2. Discussion of the Related Art

As known, a positive charge pump is a circuit suitable for generating, starting from a positive voltage having a predetermined value, a higher voltage.

Conventionally, a positive charge pump includes a plurality of stages connected in series between an input terminal of the charge pump connected to a positive voltage supply and an output terminal of the charge pump. In the simplest case, each stage substantially includes a diode-connected N-channel MOSFET and a capacitor having one plate connected to the source electrode of the MOSFET and another plate driven by a respective digital signal periodically varying between ground and the voltage supply.

In steady-state operation, the voltage gain of each stage is equal to the value of the voltage supply minus the threshold voltage of the N-channel MOSFET.

More sophisticated charge pumps have stages wherein the diode-connected MOSFET is replaced by a pass-transistor, and comprise circuits for boosting the gate voltage of the pass transistor. In this way, as long as the body effect on the threshold voltage of the pass-transistors is not very high, it is possbile to partially compensate the increase in the threshold voltage.

The main problem of these circuits resides in the fact that, due to the body effect, the threshold voltage of the N-channel MOSFETs becomes higher and higher moving from the stages proximate to the input terminal to the stages proximate to the output terminal of the charge pump. This causes a reduction in the voltage gain of the stages, and makes it necessary to increase the number of stages in order to generate a given output voltage.

A greater number of stages requires more area in the chip, and higher power consumption. Furthermore, it is not possible to generate output voltages higher than a given value, because when the threshold voltage (with body effect) of the N-channel MOSFETs becomes higher than the voltage supply, the addition of further stages is completely ineffective. Even the more sophisticated solution becomes less and less effective moving from the input terminal to the output terminal of the charge pump, and the final stages have poor efficiency.

In view of the state of the art described, it is an object of the present invention to provide an improved positive charge pump which is not affected by the above-mentioned problem.

SUMMARY OF THE INVENTION

According to the present invention, this and other objects are attained by a charge pump comprising a plurality of stages connected in series, an input terminal of the charge pump being connected to a voltage supply and an output terminal of the charge pump providing an output voltage higher than the voltage supply, each stage comprising unidirectional current flow MOS transistor means connected between a stage input terminal and a stage output terminal allowing current to flow only from said stage input terminal to said stage output terminal, and a first capacitor with one plate connected to said stage output terminal and another plate driven by a respective first digital that signal periodically switches between ground and said voltage supply, wherein the unidirectional current flow MOS transistor means of the stages have independent bulk electrodes, and in that a bias voltage generator circuit is provided for biasing the bulk electrodes of said unidirectional current flow MOS transistor means at respective bulk potentials which become progressively higher going from the stages proximate to said input terminal to the stages proximate to said output terminal of the charge pump.

Thanks to the present invention, it is possible to completely eliminate the influence of the body effect on the threshold voltage of the unidirectional current flow MOS transistor means. The efficiency of the stages of the charge pump in terms of voltage gain remains substantially constant in going from the input terminal to the output terminal of the charge pump. It is thus possible to generate a given output voltage with a smaller number of stages, with a great reduction in chip area and power consumption.

BRIEF DESCRIPTION OF THE DRAWINGS

The features of the present invention will be made apparent by the following detailed description of a particular embodiment thereof, illustrated as a non-limiting example in the annexed drawings, wherein.

DETAILED DESCRIPTION

Figure 1:
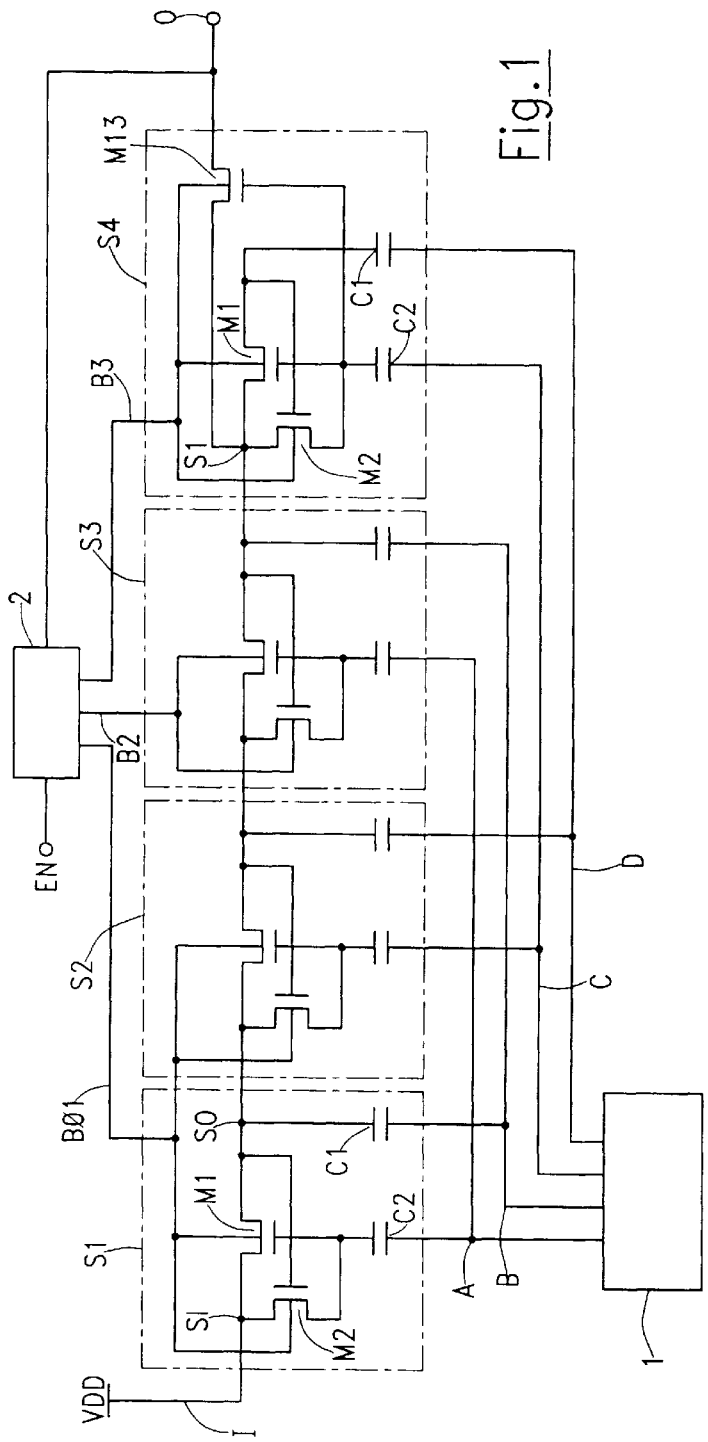
FIG. 1 is a circuit diagram of a positive charge pump according to one embodiment of the present invention.

With reference to the drawings, in FIG. 1 there is illustrated a positive charge pump according to one embodiment of the present invention. The charge pump comprises a plurality (four in this example) of stages S1–S4, connected in series between an input terminal I of the charge pump connected to a voltage supply VDD and an output terminal O of the charge pump. When the charge pump is integrated in an integrated circuit, such as for example a non-volatile memory device, VDD is the voltage supply of the device.

Each stage comprises a pass-transistor M1 formed by an N-channel MOSFET, connected between a stage input terminal SI and a stage output terminal SO; a capacitor C1 having one plate connected to the stage output terminal SO and another plate driven by a respective phase signal B or D, depending on the particular stage; a precharge transistor M2 formed by an N-channel MOSFET with an electrode connected to the stage input terminal SI, another electrode connected to the gate electrode of M1 and a gate electrode connected to the stage output terminal SO; and a boosting capacitor C2 having one plate connected to the gate electrode of M1 and another plate driven by a respective phase signal A or C, depending on the particular stage. Signals A, B, C and D are generated by a timing signal generator 1.

Figure 2:
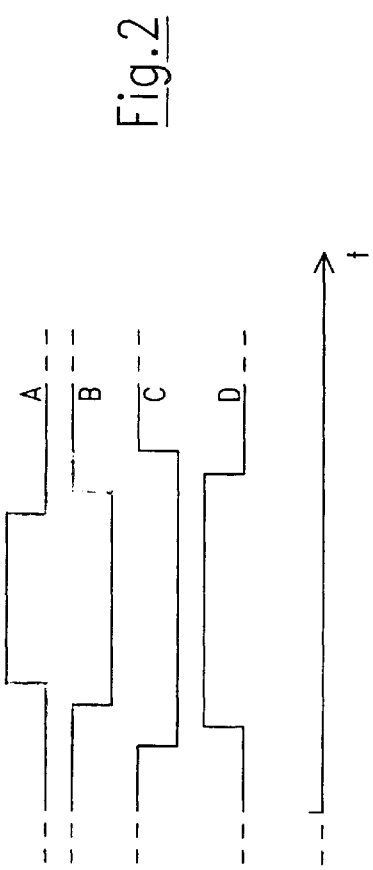
FIG. 2 is a timing diagram of drive signals for the charge pump of FIG. 1.

The timing of signals A, B, C and D is depicted in FIG. 2. These signals are digital signals periodically switching between ground and the voltage supply; signals A and D are substantially in phase to each other, and the same holds true for signals B and C; signals A and D are respectively in phase opposition to signals B and C.

MOSFETs M1 and M2 in each stage have bulk electrodes which are independent from the bulk electrodes of MOSFETs M1 and M2 in the other stages.

The last stage S4 of the charge pump further comprises an N-channel MOSFET M13 having a source connected to the stage input terminal SI, a drain connected to the output terminal O of the charge pump, gate connected to the gate of M1, and a bulk connected to the bulk of M1.

The charge pump further comprises a bias voltage generator 2 which generates three bias voltages B01, B2, B3. Bias voltage B01 is used to bias the bulk electrodes of MOSFETs M1 and M2 in the first and second stages S1 and S2; bias voltages B2 and B3 are used to bias the bulk electrodes of MOSFETs M1 and M2 in the third and fourth stages S3 and S4, respectively. For the generation of the bias voltages B01, B2 and B3, the bias voltage generator 2 is supplied with the output voltage O of the charge pump; the bias voltage generator 2 is also supplied with an enable signal EN.

It is to be observed that for an efficient biasing of the bulk electrodes of the MOSFETs M1 and M2 of the charge pump stages, two conflicting requirements must be taken into account: first, the bias voltage of the bulk electrode of MOSFETs M1 and M2 should be sufficiently high to limit the body effect; second, the voltage of the bulk electrode of the MOSFETs must always be lower or at most equal to the voltage of the source electrodes of the MOSFETs, to prevent forward biasing of the source/bulk junction.

Figure 3:
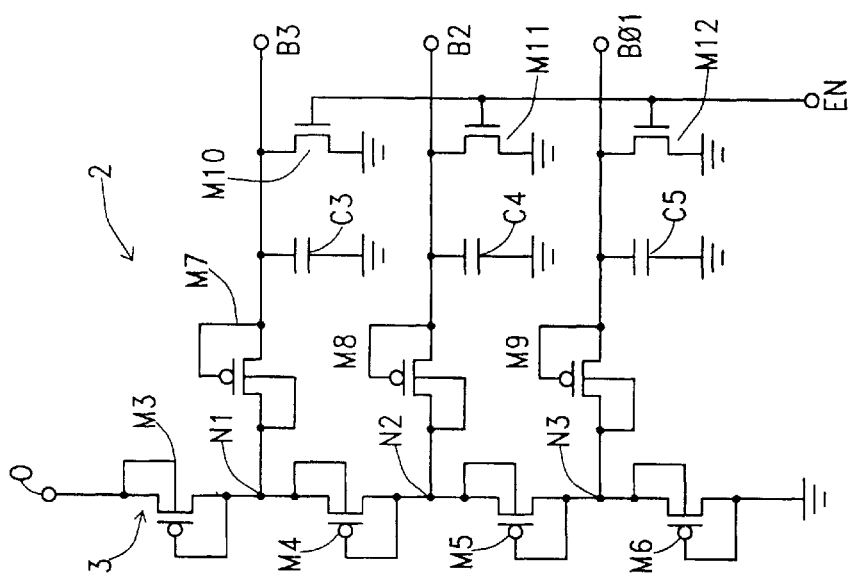
FIG. 3 is a circuit diagram of a bias circuit for the positive charge pump of FIG. 1.

FIG. 3 is a circuit diagram of a preferred embodiment of the bias voltage generator 2 suitable to satisfy the above-mentioned requirements. The circuit comprises a voltage divider 3 formed by four diode-connected P-channel MOSFETs M3, M4, M5 and M6 connected in series between the output voltage O of the charge pump and ground. Bias voltage B3 is derived from a node N1 of the voltage divider between MOSFETs M3 and M4, with the interposition of a diode-connected P-channel MOSFET M7. Similarly, bias voltage B2 is derived from a node N2 of the voltage divider between M4 and M5, with the interposition of a diode-connected P-channel MOSFET M8, and bias voltage B01 is derived from a node N3 of the voltage divider between M5 and M6, with the interposition of a diode-connected P-channel MOSFET M9. Thus, bias voltages B3, B2 and B01 are respectively equal to:

$$V(B3)=V(O)*(R4+R5+R6)/RTOT-VTHP$$

$$V(B2)=V(O)*(R5+R6)/RTOT-VTHP$$

$$V(B01)=V(O)*R6/RTOT-VTHP$$

wherein R4, R5 and R6 are the output resistances of M4, M5 and M6, respectively, RTOT is the sum of the output resistances of M3, M4, M5 and M6, and VTHP is the threshold voltage of MOSFETs M7, M8 and M9. In other words, in order to generate the bias voltages for the bulk electrodes of MOSFETs M1 and M2 of the various stages, the output voltage V(O) of the charge pump is divided for the number of stages of the charge pump.

Connected to B3, B2 and B01 are respective filter capacitances C3, C4 and C5 with one plate connected to ground, which eliminate ripples on the voltages at nodes B3, B2 and B01, respectively. Also connected to nodes B3, B2 and B01 are respective N-channel MOSFETs M10, M11 and M12 having their sources connected to ground and their gates driven by signal EN which, when the charge pump is disactivated (EN="1") forces V(B3), V(B2) and V(B01) to ground.

In operation, the circuit of FIG. 3 ensures that the bias voltages V(B01), V(B2) and V(B3) are respectively equal to the lower among the voltages of the source and drain electrodes of MOSFETs M1 and M2 in stages S1, S2, S3 and S4 (as known, in a charge pump the source and drain electrodes of the MOSFETs are not univocally defined). As a result of this, the body effect on the threshold voltage of said MOSFETs is eliminated, and at the same time it is assured that the source/bulk junctions of the MOSFETs are not forward biased. MOSFETs M7, M8 and M9 introduce a safety margin sufficient to prevent that, due to possible spurious variations, the bias voltages V(B01), V(B2) and V(B3) directly bias the source/bulk junctions of the MOSFETs of the charge pump.

Thanks to the fact that the MOSFETs of the charge pump have independent bulk electrodes and thanks to the provision of the bias voltage generator 2 which biases the bulk electrodes of said MOSFETs, it is possible to minimize the number of stage of the charge pump required for generating a given output voltage; this means a reduction in the chip area and in the power consumption. Furthermore, it is possible to generate output voltages of any value, by simply adding stages to the charge pump: each stage will have a voltage gain which is not affected by the body effect. Biasing the bulk electrodes of the MOSFETs also increase the reliability of the device, in fact when the MOSFETs are in the off condition the voltage applied to their gate oxide is lower.

Figure 4:
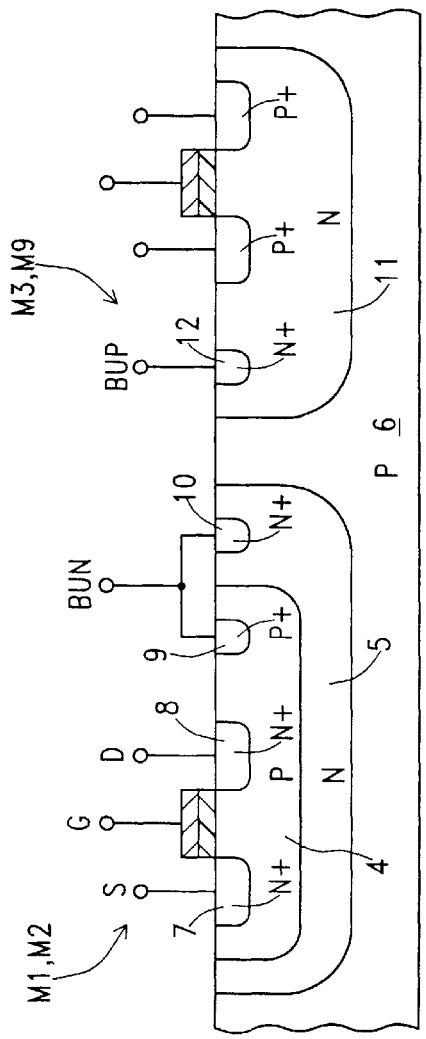
FIG. 4 is a cross-section showing two types of transistors for the circuits of FIGS. 1 and 3.

FIG. 4 shows in cross-section, side by side, a suitable structure of the N-channel MOSFETs M1 and M2 of the charge pump of FIG. 1 and the structure of the P-channel MOSFETs M3–M9 of the bias voltage generator 2 of FIG. 3. Each one of MOSFETs M1 and M2 is formed inside a respective P type well 4, formed in turn inside an N type well 5 provided in a P type substrate 6. Inside the P type well 4 two N+ regions 7 and 8 are formed, to form the source and drain electrodes of the MOSFET, and an insulated gate (gate electrode G of the MOSFET) is conventionally provided between regions 7 and 8; further, a P+ well contact region 9 is formed; a similar N+ well contact region 10 is formed inside the N type well 5. The P type well 4 and the P+ contact region 9 form the bulk electrode BUN of the MOSFET, and are short-circuited to the N+ contact region 10 to the N type well 5. In order to realize this structure, a so-called "triple well" manufacturing process is required; in fact, in order to have independent bulk electrodes which can be biased at different potentials, it is necessary that the bulk electrodes are electrically isolated from one another; this can be achieved by forming the N-channel MOSFETs inside separate P type wells 4 formed in turn inside separate N type wells 5; in a single or double well manufacturing process, the N-channel MOSFETs would be formed directly inside the P type substrate (which is normally kept grounded), and they would have a common bulk electrode.

Each one of the P-channel MOSFETs M3–M9 is instead formed inside a respective N type well 11; the bulk electrode BUP of such a MOSFET is formed by the N type well and by an N+ contact region 12 formed inside the N type well 11.

The previous description has been done referring by way of example to a particular charge pump circuit. However, it should be noted that the present invention can be applied in a straightforward way to different charge pump structures, for example those wherein each stage comprises only a diode-connected N-channel MOSFET and a capacitor.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Charge pump comprising a plurality of stages connected in series, an input terminal of the charge pump being connected to a voltage supply and an output terminal of the charge pump providing an output voltage higher than the voltage supply, each stage comprising unidirectional current flow MOS transistor means connected between a stage input terminal and a stage output terminal allowing current to flow only from said stage input terminal to said stage output terminal, and a first capacitor having one plate connected to said stage output terminal and another plate driven by a respective first digital signal that periodically switches between ground and said voltage supply, wherein the unidirectional current flow MOS transistor means of the stages have independent bulk electrodes, wherein a bias voltage generator circuit is provided for biasing the bulk electrodes of said unidirectional current flow MOS transistor means at respective bulk potentials which become progressively higher going from the stages proximate to said input terminal to the stages proximate to said output terminal of the charge pump, wherein said bulk potentials are lower or higher than said voltage supply, and wherein each of said bulk potentials is at most equal to the minimum between a source voltage and a drain voltage of the respective unidirectional current flow MOS transistor means; and wherein said bias voltage generator circuit generates said bulk potentials starting from the output voltage of the charge pump.

2. Charge pump according to claim 1, wherein said bias voltage generator circuit comprises a voltage dividing means comprising a voltage divider inserted between the output terminal of the charge pump and ground and having a number of intermediate nodes substantially equal to the number of stages of the charge pump.

3. Charge pump according to claims 2, wherein each of said bulk potentials is at most equal to the voltage of a respective intermediate node of the voltage divider.

4. Charge pump according to claim 3, wherein each of said bulk potentials is equal to the voltage of the respective intermediate node of the voltage divider, minus a prescribed voltage margin.

5. Charge pump according to claim 4, wherein each of said unidirectional current flow MOS transistor means comprises a diode-connected N-channel MOSFET.

6. Charge pump according to claim 4, wherein each of said unidirectional current flow MOS transistor means comprises an N-channel MOS field effect pass transistor, each stage further comprising gate voltage boosting means for boosting a gate voltage of the pass transistor.

7. Charge pump according to claim 6, wherein said gate voltage boosting means comprises an N-channel pre-charge MOSFET with first and second electrodes respectively connected to the stage input terminal and to the gate electrode of the pass MOSFET and a gate electrode connected to the stage output terminal, and a second capacitor with one plate connected to the gate electrode of the pass MOSFET and another plate driven by a respective second digital signal that periodically switches between ground and the voltage supply and substantially in phase opposition with respect to the first digital signal.

8. Charge pump according to claim 1, wherein each of said unidirectional current flow MOS transistor means comprises a first well region of a first conductivity type formed in a semiconductor substrate of a second conductivity type, a second well region of the second conductivity type formed inside the first well region, source and drain regions of the first conductivity type formed inside the second well region and an insulated gate disposed above the second well region between the source and drain regions, the second well region forming the bulk electrode of the MOS transistor means being isolated from the substrate by the first well region.

9. A charge pump comprising a plurality of stages connected in series and including an input terminal connected to a voltage supply, an output terminal for providing an output voltage and a bias voltage generator circuit, each said stage comprising, a stage input terminal, a stage output terminal, a unidirectional current flow transistor coupled between the stage input terminal and the stage output terminal, and a capacitor having one plate coupled to said stage output terminal and another plate driven by a periodic digital signal, each said transistor having an independent bulk electrode, said bias voltage generator circuit having separate bias circuits for biasing the bulk electrodes of the transistors at respective bulk potentials which become progressively higher going from stages proximate to said input terminal to stages proximate to said output terminal, wherein the output voltage is higher than said voltage supply, wherein said bulk potentials is lower or higher than said voltage supply, and wherein each of said bulk potentials is at most equal to the minimum between a source voltage and a drain voltage of the respective transistor; and wherein the bias voltage generator circuit has its input coupled from the output terminal so as to generate the bulk potentials starting from the output voltage of the charge pump.

10. A charge pump according to claim 9, wherein said transistor comprises a MOS transistor.

11. A charge pump according to claim 10, wherein said periodic digital signal is generated by a timing signal generator having respective signals coupled to separate stages.

12. A charge pump according to claim 11, wherein each periodic digital signal switches between ground and said voltage supply value.

13. A charge pump comprising a plurality of stages connected in series and including an input terminal connected to a voltage supply an output terminal for providing an output voltage and a bias voltage generator circuit, each said stage comprising, a stage input terminal, a stage output terminal, a unidirectional current flow transistor coupled between the stage input terminal and the stage output terminal, and a capacitor having one plate coupled to said stage output terminal and another plate driven by a periodic digital signal, each said transistor having an independent bulk electrode, said bias voltage generator circuit having separate bias circuits for biasing the bulk electrodes of the transistors at respective bulk potentials which become progressively higher going from stages proximate to said input terminal stages proximate to said output terminal, wherein the output voltage is higher than said voltage supply, wherein said bulk potentials are lower or higher than said voltage supply, and wherein said bias voltage generator circuit comprises a voltage divider coupled between the output terminal and ground and having a number of intermediate nodes.

14. A charge pump according to claim 13 wherein the number of intermediate nodes is substantially equal to the number of stages.

15. A charge pump according to claim 14 wherein each of said bulk potentials is at most equal to the voltage of a respective intermediate node of the voltage divider.

16. A charge pump according to claim 15 wherein each of said bulk potentials is equal to the voltage of the respective intermediate node of the voltage divider minus a prescribed voltage margin.

17. A charge pump according to claim 16 wherein each of said transistors comprise a diode-connected N-channel MOSFET.

18. A charge pump according to claim 16 wherein each of said transistors comprise an N-channel MOS field effect pass transistor.

19. A charge pump according to claim 18 wherein each stage further comprises a gate voltage boosting circuit for boosting a gate voltage of the pass transistor.

20. A charge pump according to claim 19 wherein said gate voltage boosting circuit comprises an N-channel precharge MOSFET with the first and second electrodes respectively connected to the stage input terminal and to the gate electrode of the pass MOSFET and a gate electrode connected to the stage output terminal.

21. A charge pump according to claim 20, wherein the gate voltage boosting circuit further includes a second capacitor with one plate connected to the gate electrode of the pass MOSFET and another plate driven by a respective second digital signal that periodically switches between ground and the voltage supply and substantially in phase opposition with respect to the first digital signal.

22. A charge pump according to claim 9, wherein said transistor is a MOS transistor with each MOS transistor comprising a first well region of a first conductivity type formed in a semiconductor substrate of a second conductivity type, a second well region of the second conductivity type formed inside the first well region, source and drain regions of the first conductivity type formed inside the second well region and an insulated gate disposed above the second well region between the source and drain regions, the second well region forming the bulk electrode of the MOS transistor means being isolated from the substrate by the first well region.

\* \* \* \* \*

UNITED STATES PATENT AND TRADEMARK OFFICE
CERTIFICATE OF CORRECTION

PATENT NO. : 6,075,402
DATED : June 13, 2000
INVENTOR(S) : Andrea Ghilardelli, Jacopo Mulatti and Stefano Ghezzi It is certified that error appears in the above-identified patent and that said Letters Patent is hereby corrected as shown below:

On the title page, item [75] should read as follows:

[75] Inventors: Andrea Ghilardelli, Cinisello; Jacopo Mulatti, Latisana; Stefano Ghezzi Treviolo, all of Italy Signed and Sealed this Twenty-seventh Day of March, 2001

*Attest:*

NICHOLAS P. GODICI

*Attesting Officer*     *Acting Director of the United States Patent and Trademark Office*